United States Patent [19]

Murata et al.

[11] Patent Number: 5,148,708
[45] Date of Patent: Sep. 22, 1992

[54] LIQUID LEVEL SENSOR WHICH PREVENTS LIQUID ABSORPTION

[75] Inventors: Michihiro Murata, Kyoto; Akira Kumada; Shigeo Yamazaki, both of Yokohama; Kenji Matsuo, Sagamihara, all of Japan

[73] Assignee: Murata Mfg. Co., Ltd., Kyoto, Japan

[21] Appl. No.: 692,660

[22] Filed: Apr. 29, 1991

[30] Foreign Application Priority Data

May 8, 1990 [JP] Japan ............................... 2-118020

[51] Int. Cl.$^5$ .................................................. G01F 23/24
[52] U.S. Cl. ................................ 73/304 R; 73/290 R; 338/38
[58] Field of Search ............ 73/290 R, 304 R, 304 C, 73/305, 314, 319; 338/36, 38, 44, 27, 81, 94, 231; 128/761

[56] References Cited

U.S. PATENT DOCUMENTS

| | | | |
|---|---|---|---|
| 3,370,466 | 2/1968 | Chang | 73/304 R |
| 4,169,377 | 10/1979 | Scheib | 73/304 R |
| 4,637,254 | 1/1987 | Dyben et al. | 73/304 R X |
| 4,827,769 | 5/1989 | Riley et al. | 73/304 R X |
| 4,961,064 | 10/1990 | Hara | 338/231 |
| 5,033,300 | 7/1991 | Matsuo | 73/304 R |

FOREIGN PATENT DOCUMENTS

14919  2/1981  Japan ............................. 73/304 R

Primary Examiner—William A. Cuchlinski, Jr.
Assistant Examiner—G. Bradley Bennett
Attorney, Agent, or Firm—Oliff & Berridge

[57] ABSTRACT

A liquid level sensor for detecting a level of an electrolyte where: a pair of resistance films are formed on an insulating substrate: a plurality of electrodes are intermittently mounted on the resistance films in the longitudinal direction; the resistance films are soaked in the electrolyte in the vertical direction along the longitudinal direction; the liquid surface is detected from the variation of the resistance value of the resistance films caused by the short-circuiting of pairs of the electrodes in the electrolyte. The exposed surface of the resistance film is covered by a moisture-resistance film. The result is that undesirable change of resistance value of the resistance film caused by being moistened can be reliably prevented.

21 Claims, 7 Drawing Sheets

LIQUID LEVEL SENSOR WHICH PREVENTS LIQUID ABSORPTION

BACKGROUND OF THE INVENTION

1. Field of the Invention

This invention relates to a liquid level sensor, and more particularly to an improved liquid sensor suitable for easily measuring the level variation of an object solution containing electrolyte.

2. Description of the Related Art

Heretofore, a variety of sensors for detecting a liquid level have been developed to measure a stored amount or a flowing amount of liquid.

Typically, such sensors are designed to optically or magnetically detect the position of a float on the liquid surface.

These conventional liquid level sensors are able to detect the liquid level irrespective of the type of liquid but not with high accuracy, and are required to be significantly large-scaled.

If the subject liquid is an electrolyte, a sensor based on the electric conductivity of the solution can be used instead of the float-type sensor.

Such an electrolyte includes those used in the various chemical processes. Further, the sensor of this type can also be applied to measure a sampled amount of body fluids such as urine which have certain electrical conductivity.

Figure 7:
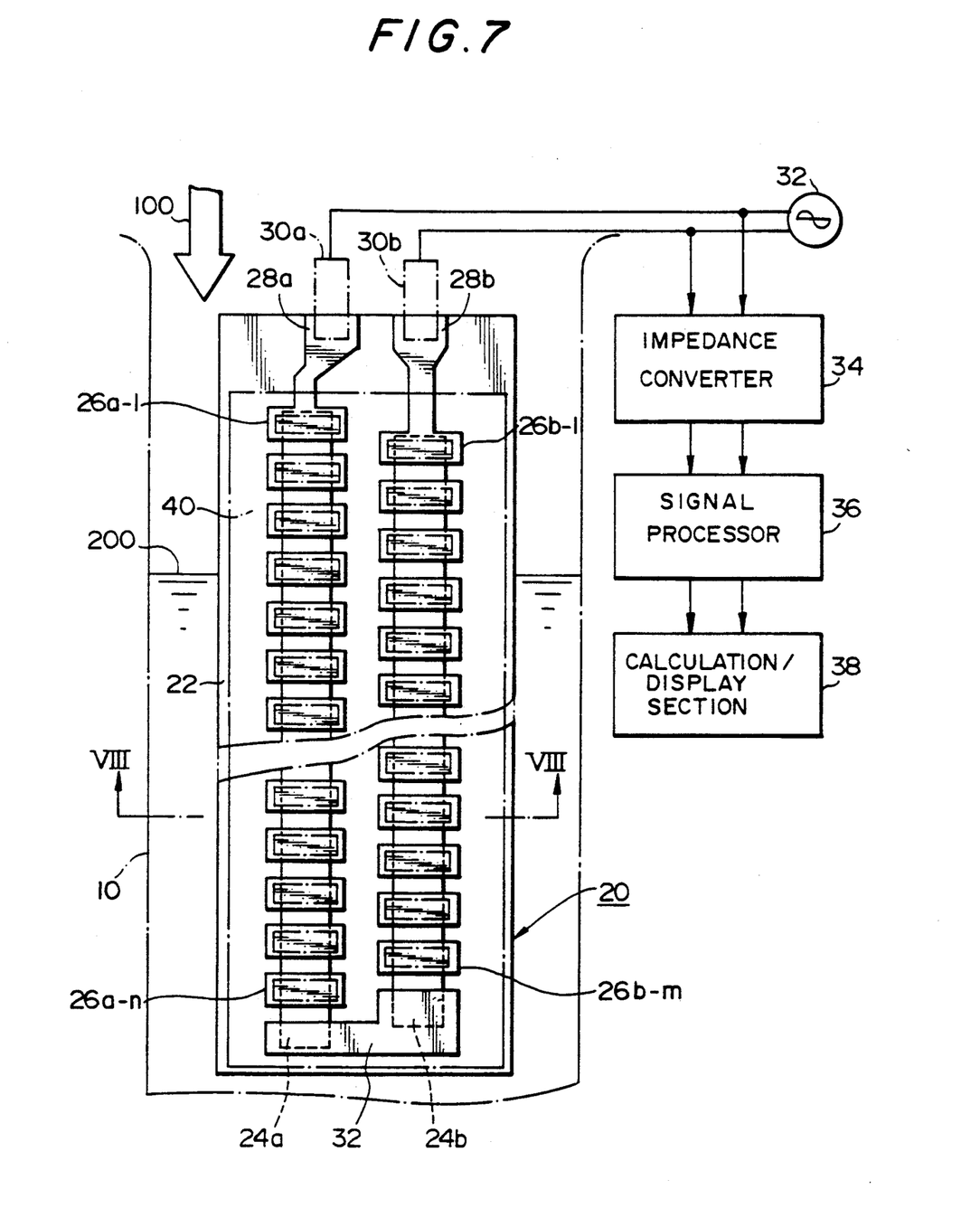
FIG. 7 is a schematic view showing a liquid level sensor.
Figure 8:
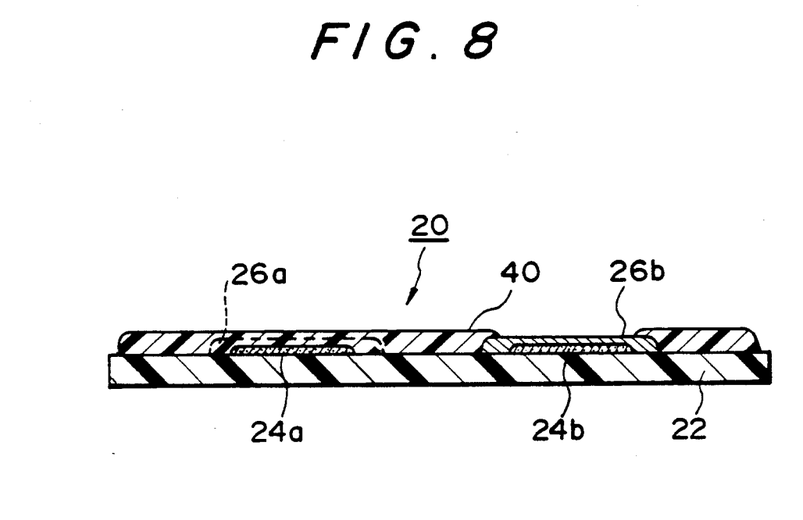
FIG. 8 is a cross-sectional view cut at line VIII—VIII of FIG. 7.

FIGS. 7 and 8 show an example of a liquid level sensor for detecting an electrolyte surface level as disclosed in U.S. Pat. No. 5,033,300 "Device for measuring displacement and U.S. Ser. No. 626,616 "Body fluid excretion measurement apparatus for medical application", in which a liquid level sensor 20 is accommodated within a recipient 10 to measure a sampled amount of body fluid of a patient.

The liquid sensor 20 is designed such that a pair of resistance films 24a, 24b are vertically mounted parallel to each other on an insulating substrate 22 made of plastics etc. by printing, vapor deposition or the like.

Such resistance films 24a, 24b typically consist of a carbon resistance, for example, which are printed on the insulating substrate 22 in the shown example.

A plurality of electrodes 26a1, ... 26a-n, and 26b-1, ... 26b-m are screen printing vapor-deposited on the resistance films 24a, 24b along their longitudinal direction.

These electrodes 26 are made of e.g. silver thin film disposed so that the electrodes on resistance film 24a are staggered with respect to those on resistance film 24b.

In this embodiment, at the highest stage of the film 24, electrodes 26a-1, 26b-1 are integrated with the lead electrodes 28a, 28b respectively, and coupled to a liquid level circuit through external terminals 30a, 30b.

On the contrary, at the lowest stage, a common electrode 32 is disposed in contact with both of the resistance films 24a, 24b.

Accordingly, when subject liquid is injected into the recipient 10 as shown by an arrow 100, the liquid level 200 changes in accordance with the injected amount, and makes the electrodes 26 mounted on the resistance films 24a, 24b conductive successively. This means that the resistance value between the lead terminals 28a and 28b decreases successively as the liquid level rises, thereby quite easily enabling the detection of the liquid level.

Figure 9:
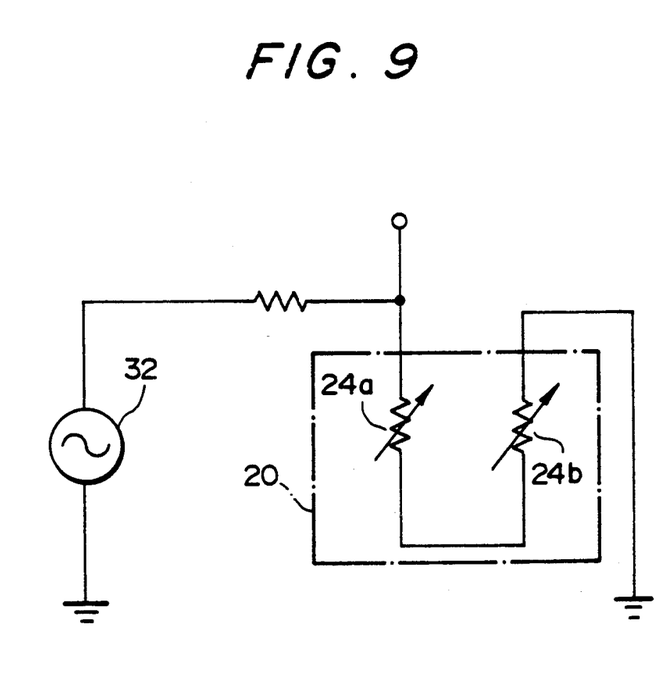
FIG. 9 is an equivalent circuit of the resistance liquid level sensor of FIG. 7.
Figure 10:
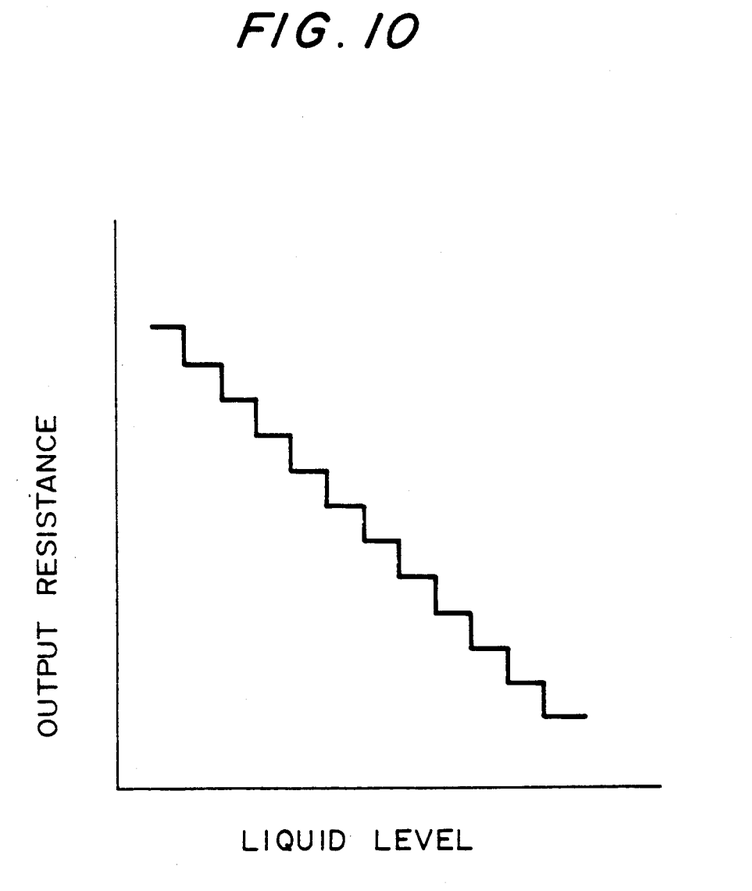
FIG. 10 is a graphic diagram showing characteristics of a liquid sensor having intermittent electrodes.

FIG. 9 shows an equivalent circuit of the above-mentioned liquid level sensor. The sensor receives A.C. signals for measurement supplied from an A.C. source 32, and outputs the detected signal to a signal processor 36 through an impedance converting circuit 34 for electrically processing the liquid level data to be displayed thereafter in the calculation/display section 38.

The left and right electrodes 26 are successively and intermittently conducted as the liquid level rises. In this example, the surfaces of the electrodes 26 are coated with a water-repellant layer except at their essential electrode portion for protecting them from being moistened due to the surface tension of the liquid when located above the liquid level 200, at that time.

That is, typically the insulating substrate 22, the resistance film 24, and the electrodes easily get wet. As a result, when the liquid surface is shaken or scattered, the electrodes 26 above the liquid level sometimes undesirably become conductive, thereby causing measuring error.

The water-repellent layer is aimed at preventing such an inconvenience. In FIG. 8, as shown by chain lines, a water-repellent layer 40 is applied to the electrodes 26 with only their center portion being exposed to the liquid. Consequently, at the water-repellent layer 40, the liquid would be nearly all repelled so as not to conduct the electrodes irrespective of the liquid surface shaking or scattering, enabling the elimination of any measuring error.

According to such a type of liquid level sensor 20, the output of the resistance value would become an output changing in stages in accordance with the liquid level for successively conducting the electrodes. Thus, desirable measurement resolution can be obtained by setting the distance between the electrodes properly.

However, in such a liquid level sensor, a disadvantage has arisen; the subject liquid soaks into the resistance films, acting to determine the output resistance, and causes changes in the resistance value resulting in significant measuring error.

Particularly, in the case of carbon resistance or the like having a high water-absorptive property, upon being used once it has been impossible to maintain its original resistance value. In other words, it was not reusable. Further, the resistance film sometimes gets wet even at the first use, causing measuring error.

In the above-mentioned apparatus, the resistance film 24 is coated with the water-repellent layer 40. However, silicon-type coating materials typically used for the water-repellent layer cannot be sufficiently waterproof, causing the resistance film to absorb the liquid through the water-repellent layer 40.

In such a type of liquid sensor, particularly when used for a liquid with the surface gradually varying over a long time, the resistance film comes to absorb the liquid through the portion flooded therein, thereby causing measuring errors.

SUMMARY OF THE INVENTION

It is therefore an object of this invention to provide a liquid level sensor which is certainly free of the measuring error caused by the liquid absorption of the resistance film.

The present invention features the exposed surface of the resistance film with a water-proof film.

According to this invention, since the resistance film made of carbon etc. is tightly protected by the water-proof layer, any possibility of the measuring error arising due to the change of resistance value caused by the water absorption action of the resistance film is removed.

The above and other advantages, features and additional objects of this invention will be manifest to those versed in the art upon making reference to the following detailed description and the accompanying drawings in which a structural embodiment incorporating the principles of this invention is shown by way of illustrative example.

DETAILED DESCRIPTION

Figure 1:
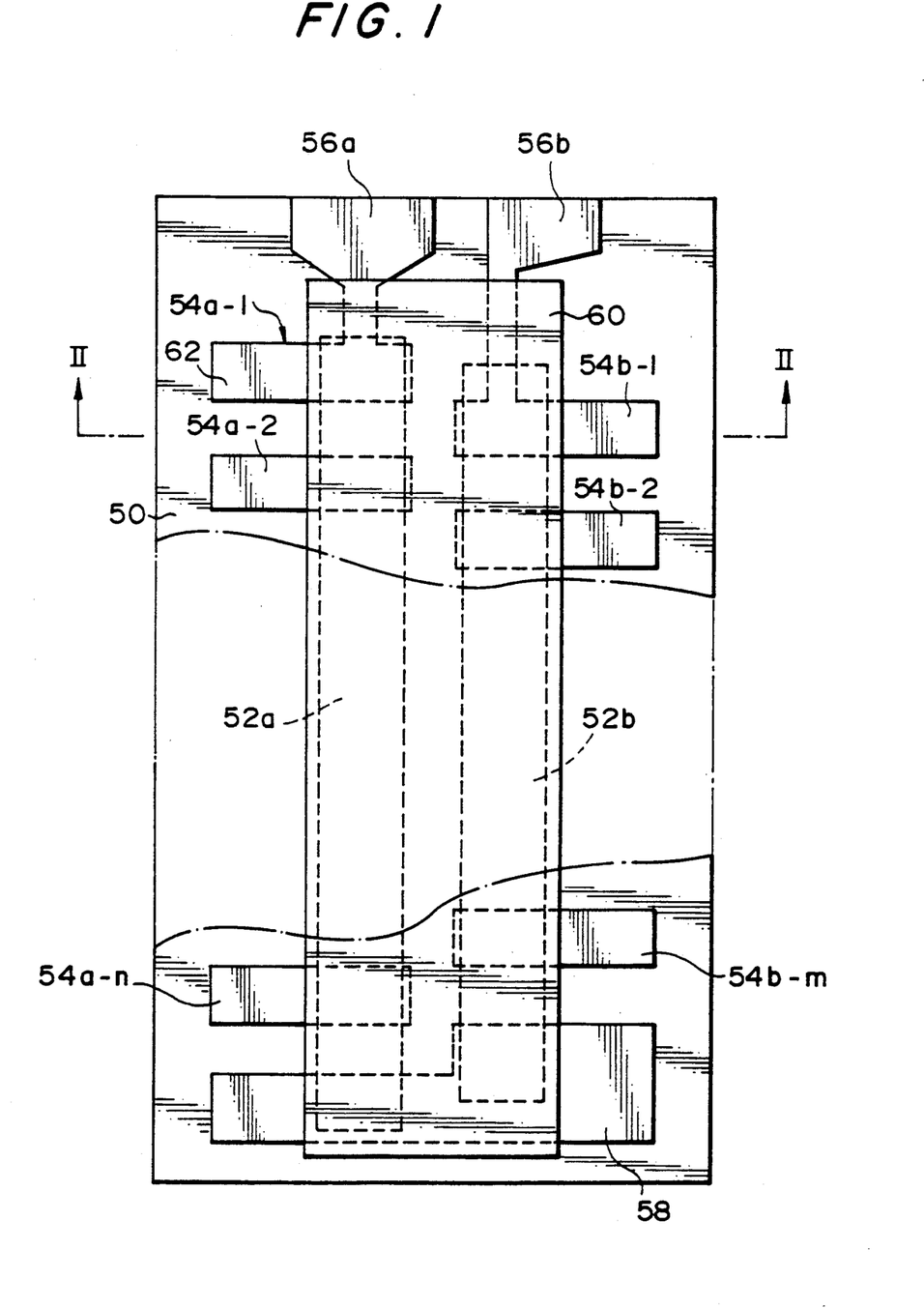
FIG. 1 is a partially enlarged plan view showing a first embodiment of the liquid level sensor according to this invention.

The principles of this invention are particularly useful when embodiment in a liquid level sensor such as shown in FIG. 1.

Figure 2:
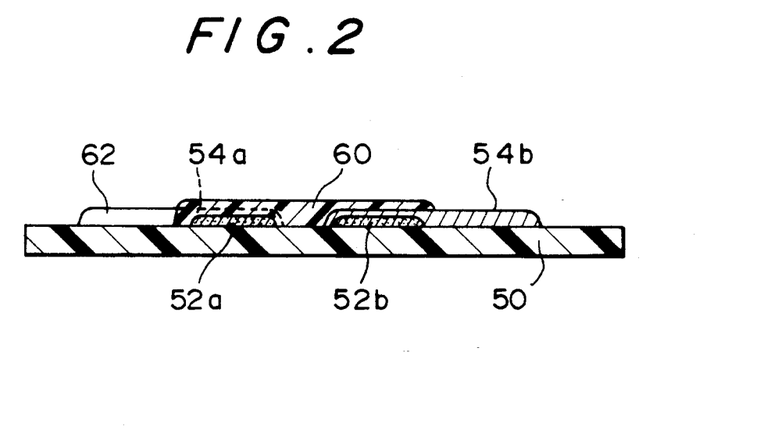
FIG. 2 is a cross-sectional view cut at line II—II of FIG. 1.

FIGS. 1 and 2 show the first embodiment of the liquid level sensor according to this invention. In the same manner as the aforementioned sensor, the subject liquid which includes an electrolyte matter, for example, body fluid like urine is filled in or is flowing through a recipient, which accommodates, in an almost vertical direction, a pair of resistant films for electrically detecting the liquid level by the conductivity between the electrodes provided at regular intervals.

A pair of resistance films 52a, 52b comprising carbon resistance or the like having a thickness of 30-50 μm are applied to the insulating substrate 50 made of plastic thin film etc. having a thickness of 80-100 μm parallel to one another. In this embodiment, these films 52 are formed on the insulating substrate 50 by screen printing or vapor deposition. As illustrated in the figures, the resistance films 52 have a lengthwise dimension which is larger than a widthwise dimension of the resistance films.

The insulating substrate 50 itself has silicon-type plastic thin film having a water-repellent property, like a polyethylene thin film.

Therefore, as described more in detail hereinafter, the liquid can be repelled from the insulating substrate 50 except the essential electrode portion, thereby reliably preventing the measuring error caused by the moistened resistance coats.

Like the sensor, in this embodiment a plurality of electrodes 54a-1–54a-n, 54b-1–54b-n are disposed at regular intervals along the longitudinal direction of both resistance films 52.

The resolution of the liquid level measurement depends on the interval between the electrodes being set at less than 1 mm in this embodiment, though shown enlarged in FIG. 1 for clarity.

The electrodes 54a-1, 54b-1 at the highest position are coupled to an external circuit through lead electrodes 56a, 56b provided in vicinity thereof respectively.

The electrode 58 at the lowest position 58 conducts the resistance films 52a, 52b.

For a significant feature of this invention, the resistant films 52a, 52b are covered by a water-proof film 60 made of polyethylene film.

Therefore, according to this invention, the resistance films 52 are protected by the water-proof film 60 from absorbing the liquid even in the soaked state so as to keep its resistance value stable.

In this embodiment, unlike the aforementioned sensor, the electrode 54, mounted on the resistance films 52 for making electrical contact between electrodes 54a, has an arm portion extending outwards from the film 52. The arm portion 62 in FIG. 1 appears projected in the left-hand direction of the electrode 54a-1. Although their numerals are omitted in the drawing, the other electrodes also have the arm portions in the same manner; the electrode group 54a with them projected in the left-hand direction, while the electrode group 54b with them projected in the right-hand direction.

With such an arm portion 62, the resistance 52a and 52b through the liquid can be reliably conducted by the arm portion 62 even when the resistance films 52 are thoroughly covered by the water-proof film 60.

In this manner, according to this invention, the resistance films 52 are wholly covered by the water-proof film 60 made of polyethylene-type plastics to prevent measuring error due to the variation of the resistance value caused by liquid absorption, thereby realizing repeated use of the same liquid level sensor.

In the shown embodiment, the arm portion 62 for conducting with the liquid is screen-printed or vapor-deposited directly on the insulating substrate 50a having a water-repellent characteristic. As a result, the arm portion 62 in contact with the liquid is protected from being moistened by the liquid while performing desired detection using the gradual and linear properties of the changing resistance values of the resistance films.

Figure 3:
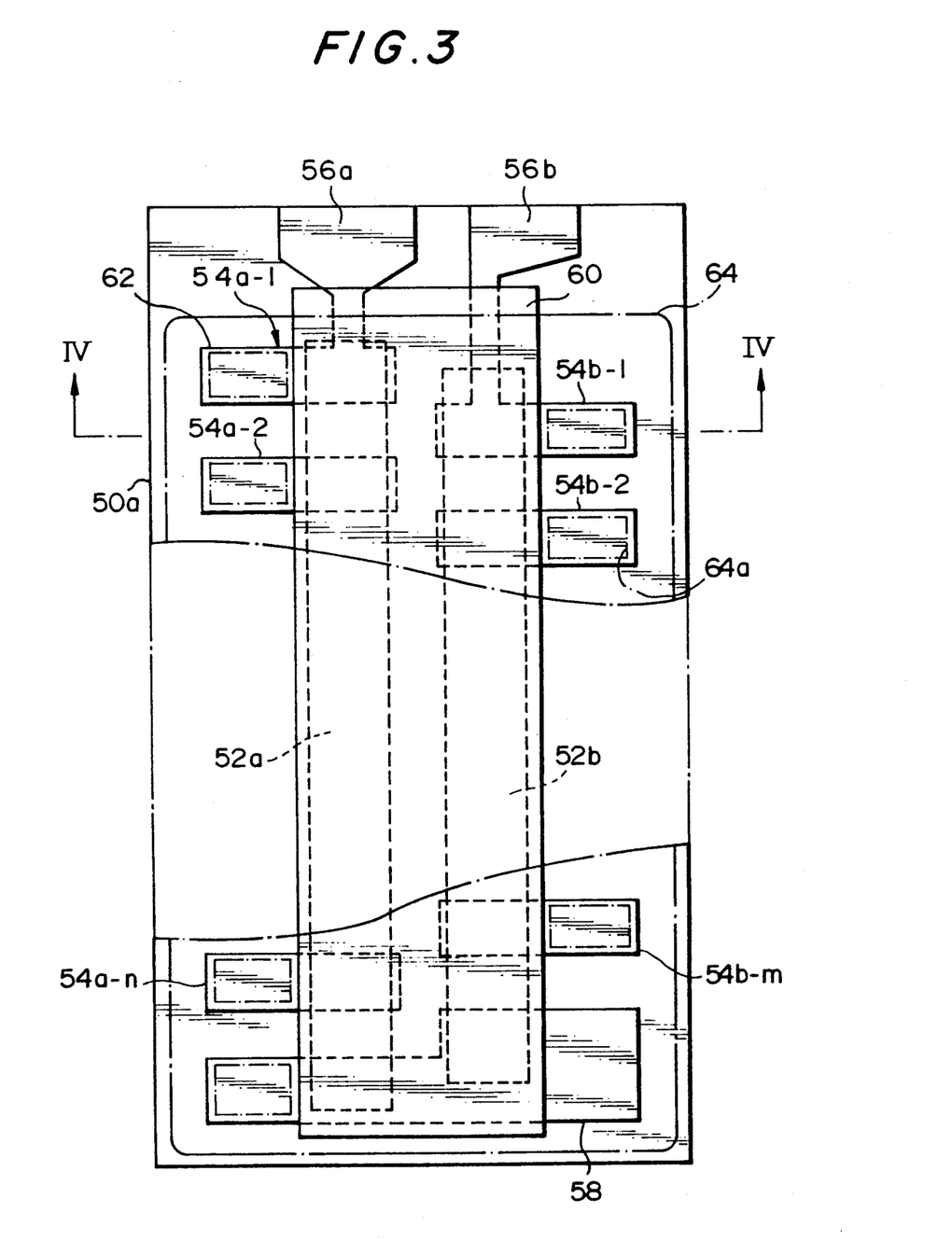
FIG. 3 is a partially enlarged plan view showing a second embodiment of the liquid level sensor according to this invention.
Figure 4:
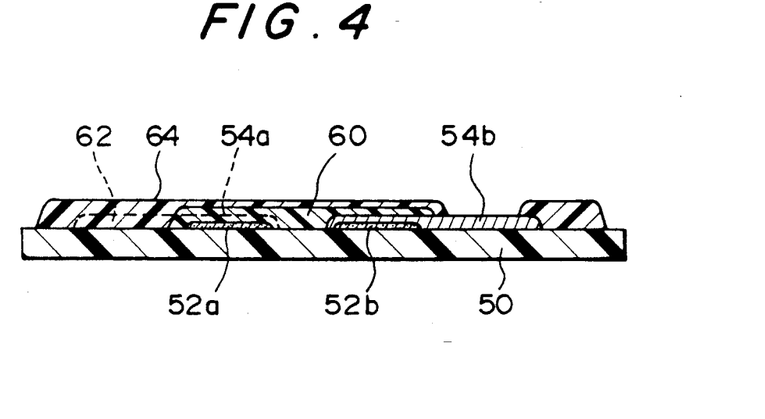
FIG. 4 is a cross-sectional view cut at line IV—IV of FIG. 3.

FIGS. 3 and 4 show a preferred second embodiment of the liquid sensor of this invention.

For a significant feature in this embodiment, the insulating substrate 50 is made of normal plate of poor water-repellent property such as phenol resin, and is formed by coating with a water-repellent layer 64 e.g. silicon type coating material etc. as shown in dotted line after sequentially laminating the resistance films 52, the electrodes 54, and the water-proof film 60 thereon.

Of course, the water-repellent layer 64 has a window 64a for exposing the arm portion 62 to be in contact with the liquid.

Accordingly, the water-repellent layer 64 surely repels the water between the electrodes, and also on the water-proof film 60.

Figure 5:
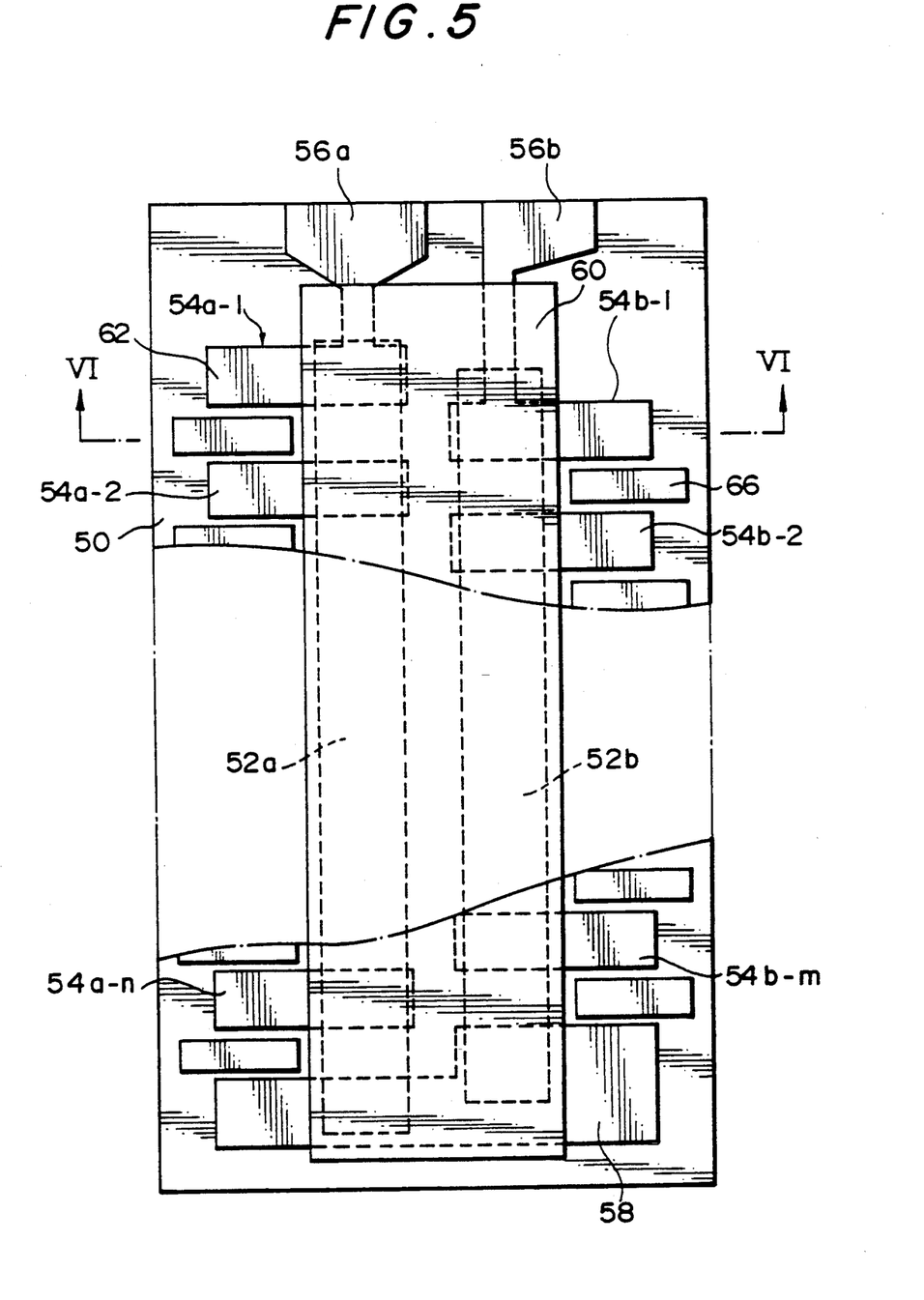
FIG. 5 is a partially enlarged plan view showing a third embodiment of the liquid level sensor according to this invention.
Figure 6:
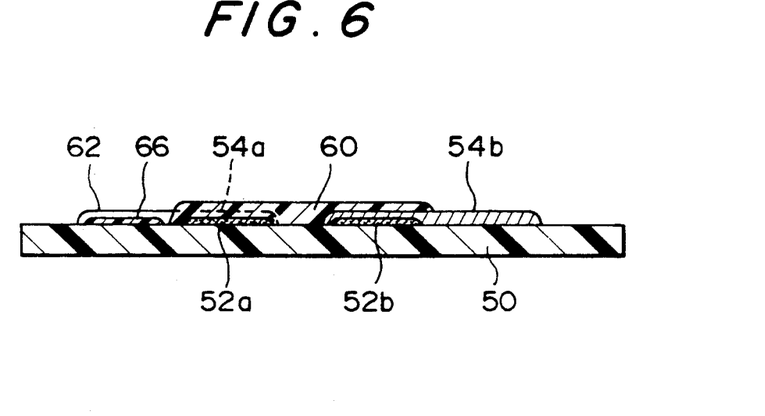
FIG. 6 is a cross-sectional view cut at line VI—VI of FIG. 5.

FIGS. 5 and 6 show a third embodiment of the liquid level sensor of this invention.

For a significant feature of this embodiment, there is provided a water-repellent layer 66 between the electrodes 54 to repellently separate the electrodes 54 from each other.

According to the third embodiment, an excellent water-repellent effect can be obtained by repellently separating between the electrodes which may easily mutually conduct thereby causing measuring errors, though the whole water-repellent effect would not be so high as in the second embodiment.

Also in the third embodiment, the water-proof film 60 acts in the same manner as in the aforementioned embodiments.

As described above, according to this invention, the measuring error due to the liquid-absorption can be reliably avoided by covering the highly water-absorptive resistance films with a water-proof layer, thereby an accurate and stable liquid sensor can be obtained.

Further, since the resistance films do not absorb the liquid, the liquid sensor can be repeatedly used, preventing corrosion caused by the absorbed electrolyte and extending significantly the life of the liquid sensor.

What is claimed is:

1. A liquid level sensor for detecting the level of a liquid including an electrolyte matter, comprising:
    (a) an insulating substrate made of plastic thin film;
    (b) a pair of resistance films disposed in parallel to each other with a predetermined space therebetween on said insulating substrate, said resistance films each having a lengthwise dimension which is larger than a widthwise dimension of said resistance films;
    (c) a plurality of detecting electrodes mounted intermittently in a longitudinal direction on said resistance films, each electrode including an arm portion extending from said resistance films;
    (d) lead electrodes mounted at one end of said resistance films, respectively; and
    (e) a water-proof film for covering an exposed surface of said resistance films;
    wherein the resistance between said lead electrodes, upon application of a voltage, depends on the liquid level of the electrolyte.

2. A liquid level sensor according to claim 1, wherein said arm portion of each said detecting electrode projects partially from said water-proof film.

3. A liquid level sensor according to claim 2, wherein each said arm portion extends on a surface of said insulating substrate in a horizontal direction from said resistance films.

4. A liquid level sensor according to claim 1, wherein water-repellent layers are formed between said detecting electrodes.

5. A liquid level sensor according to claim 1, wherein said insulating substrate is made of polyethylene-type plastic.

6. A liquid level sensor for detecting the level of a liquid including an electrolyte matter, comprising:
    (a) an insulating substrate made of plastic thin film;
    (b) a pair of resistance films disposed in parallel to each other with a predetermined space therebetween on said insulating substrate, said resistance films each having a lengthwise dimension which is larger than a widthwise dimension of said resistance films;
    (c) a plurality of detecting electrodes mounted intermittently in a longitudinal direction on said resistance films, each electrode including an arm portion extending from said resistance films;
    (d) a water-proof film for covering an exposed surface of said resistance films; and
    (e) a water-proof layer at least for covering said detecting electrodes, a part of each said arm portion remaining uncovered by said water-proof layer;
    wherein the resistance between said lead electrodes, upon application of a voltage, depends on the liquid level of the electrolyte.

7. A liquid level sensor according to claim 6, wherein said arm portion of each said detecting electrode projects partially from said water-proof layer.

8. A liquid level sensor according to claim 7, wherein each said arm portion projects in a horizontal direction from said resistance films.

9. A liquid level sensor according to claim 6, wherein said water-proof layer has a window for exposing said arm portion in contact with said liquid.

10. A liquid level sensor for detecting the level of a liquid including an electrolyte matter, comprising:
    (a) an insulating substrate made of plastic thin film;
    (b) a pair of resistance films disposed in parallel to each other with a predetermined space therebetween on said insulating substrate, said resistance films each having a lengthwise dimension which is larger than a widthwise dimension of said resistance films;
    (c) a plurality of detecting electrodes formed intermittently in a longitudinal direction on said resistance films, each electrode including an arm portion extending from said resistance films;
    (d) lead electrodes mounted at one end of said resistance films, respectively; and
    (e) a water-proof film for covering an exposed surface of said resistance films;
    wherein the resistance between said lead electrodes, upon application of a voltage, depends on the liquid level.

11. A liquid level sensor for detecting the level of a liquid according to claim 10, wherein said arm portion of each of said detecting electrodes projects partially from said water-proof film.

12. A liquid level sensor according to claim 10, wherein each said arm portion extends on a surface of said insulating substrate in a horizontal direction from said resistance films.

13. A liquid level sensor according to claim 10, wherein, wherein water-repellent layers are formed between said detecting electrodes.

14. A liquid level sensor according to claim 10, wherein said insulating substrate is made of polyethylene-type plastic.

15. A liquid level sensor according to claim 10, further comprising a water-proof layer at least for covering said detecting electrodes, a part of said arm portion remaining uncovered by said water-proof layer.

16. A liquid level sensor for detecting the level of a body fluid, comprising:
    an insulating substrate;
    a pair of resistance films disposed in parallel to each other with a predetermined space therebetween on said insulating substrate, said resistance films each having a lengthwise dimension which is larger than a widthwise dimension of said resistance films;
    a plurality of detecting electrodes formed in a longitudinal direction on said resistance films, each electrode including an arm portion extending from said resistance films;

lead electrodes formed at one end of said resistance films, respectively; and a water-proof film for covering an exposed surface of said resistance films;

wherein the resistance between said lead electrodes, upon application of a voltage, depends on the liquid level.

17. A liquid level sensor according to claim 16, wherein said arm portion of each said detecting electrode projects partially from said water-proof film.

18. A liquid level sensor according to claim 16, wherein each said arm portion extends on said insulating substrate in a horizontal direction from said resistance films.

19. A liquid level sensor according to claim 16, wherein water-repellent layers are formed between said detecting electrodes.

20. A liquid level sensor according to claim 16, wherein said insulating substrate is made of polyethylene-type plastic.

21. A liquid level sensor according to claim 16, further comprising a water-proof layer at least for covering said detecting electrodes, a part of each said arm portion remaining uncovered by said water-proof layer.

* * * * *